United States Patent
Bain (10) Patent No.: US 10,552,466 B2
(45) Date of Patent: Feb. 4, 2020

(54) SEARCH INDEX

(71) Applicant: Business Partners Limited, London (GB)

(72) Inventor: Simon Ian Bain, Berwickshire (GB)

(73) Assignee: Business Partners Limited, London (GB)

( * ) Notice: Subject to any disclaimer, the term of this patent is extended or adjusted under 35 U.S.C. 154(b) by 0 days.

(21) Appl. No.: 15/343,958

(22) Filed: Nov. 4, 2016

(65) Prior Publication Data

US 2017/0169104 A1    Jun. 15, 2017

Related U.S. Application Data

(63) Continuation of application No. 14/130,864, filed as application No. PCT/EP2012/063319 on Jul. 6, 2012, now Pat. No. 9,519,665.

(30) Foreign Application Priority Data

Jul. 6, 2011    (GB) .................................. 1111554.0

(51) Int. Cl.
*G06F 17/30* (2006.01)
*G06F 16/338* (2019.01)
(Continued)

(52) U.S. Cl.
CPC ........ *G06F 16/338* (2019.01); *G06F 16/2228* (2019.01); *G06F 16/245* (2019.01);
(Continued)

(58) Field of Classification Search
CPC ...................................................... G06F 9/45
(Continued)

(56) References Cited

U.S. PATENT DOCUMENTS 7,552,327 B2 * 6/2009 Halcrow ................. G06F 21/46
                                                                713/165
7,797,299 B2    9/2010 Thrasher
(Continued)

FOREIGN PATENT DOCUMENTS

EP          1197885 A2    4/2002

OTHER PUBLICATIONS

Oct. 9, 2012—International Search Report—PCT/EP2012/063319.
(Continued)

*Primary Examiner* — Kim T Nguyen
(74) *Attorney, Agent, or Firm* — Banner & Witcoff, Ltd.

(57) ABSTRACT

Method of searching comprising applying a function to individual elements within a digital work to form a set of index elements. Storing the index elements as an index for the digital work. Receiving a search term. Applying the function to one or more individual elements within the search term to convert the search term into one or more converted search term elements. Identifying a digital work having an index containing one or more index elements that match one or more of the converted search term elements. Returning search results of the identified digital work.

Method of searching for a digital work comprising the steps of providing a search term. Receiving search results formulated by applying a function to one or more individual elements within the search term to convert the search term into one or more converted search term elements. Identifying a digital work having an index containing one or more index elements that match one or more of the converted search term elements, wherein the index is formed by applying the function to individual elements within the digital work to form a set of the index elements.

(Continued)

Searchable index for a digital work formed by applying a function to individual elements within the digital work to form a set of index elements.

19 Claims, 3 Drawing Sheets

(51) Int. Cl.
    *G06F 16/245* (2019.01)
    *G06F 16/31* (2019.01)
    *G06F 16/22* (2019.01)
    *G06F 21/62* (2013.01)
    *G06F 21/60* (2013.01)

(52) U.S. Cl.
    CPC .......... *G06F 16/316* (2019.01); *G06F 21/602* (2013.01); *G06F 21/6218* (2013.01); *G06F 21/6227* (2013.01)

(58) Field of Classification Search
    USPC ........................................................ 707/741
    See application file for complete search history.

(56) References Cited

U.S. PATENT DOCUMENTS

| | | | | |
|---|---|---|---|---|
| 7,822,733 | B2 | 10/2010 | Son | |
| 8,425,297 | B2* | 4/2013 | Kane | G07C 15/005 |
| | | | | 463/13 |
| 8,510,846 | B1* | 8/2013 | Gunnarson | G06F 21/6227 |
| | | | | 713/156 |
| 8,599,832 | B2* | 12/2013 | Altberg | H04M 7/006 |
| | | | | 370/352 |
| 8,620,881 | B2* | 12/2013 | Chamberlain | G06F 16/2455 |
| | | | | 707/693 |
| 9,003,474 | B1* | 4/2015 | Smith | G06F 16/00 |
| | | | | 726/1 |
| 9,015,279 | B2* | 4/2015 | Telesco | H04L 29/12066 |
| | | | | 709/218 |
| 9,049,010 | B2* | 6/2015 | Jueneman | G06F 21/32 |
| 9,087,436 | B2* | 7/2015 | Kane | G07C 15/005 |
| 9,152,579 | B2* | 10/2015 | Mattsson | G06F 21/6209 |
| 9,425,960 | B2* | 8/2016 | Kerschbaum | H04L 9/3013 |
| 2005/0120233 | A1 | 6/2005 | Halcrow et al. | |
| 2006/0101285 | A1 | 5/2006 | Chen et al. | |
| 2009/0138698 | A1 | 5/2009 | Chang et al. | |
| 2010/0146299 | A1 | 6/2010 | Swaminathan et al. | |
| 2010/0153403 | A1 | 6/2010 | Chang et al. | |
| 2010/0169321 | A1 | 7/2010 | Wang et al. | |
| 2011/0004607 | A1 | 1/2011 | Lokam et al. | |

OTHER PUBLICATIONS

Feb. 6, 2012—United Kingdom Search Report—UK App 1111554.0.

D Song et al, Proceedings of the 2000 IEEE Symposium on Security and Privacy, 2000, pp. 44-55, "Practical Techniques for Searches on Encrypted Data".

S Artzi et al, CSAIL Technical Reports, Feb. 23, 2006, Massachusetts Institute of Technology, "Encrypted Keyword Search in a Distributed Storage System".

M Raykova et al, Proceedings of the 2009 ACM workshop on Cloud computing security, 2009, pp. 115-126, "Secure Anonymous Database Search".

W Lu et al, Proceedings of SPIE, vol. 7254, 2009, "Enabling search over encrypted multimedia databases".

* cited by examiner

SEARCH INDEX

CROSS REFERENCE TO RELATED APPLICATIONS

This application is a continuation of U.S. application Ser. No. 14/130,864, filed Jun. 10, 2014, entitled "Search Index", which claims priority to PCT application PCT/EP2012/063319, filed Jul. 6, 2012, entitled "Search Index," which claims priority to United Kingdom application no. 1111554.0, filed Jul. 6, 2011, each of which is herein incorporated by reference in their entireties for all purposes.

FIELD OF THE INVENTION

The present invention relates to a method of searching and creating a searchable index for a digital work such as a text document.

BACKGROUND OF THE INVENTION

Searching for documents or other digital works may be achieved by identifying documents that contain a word or words present in a search term. Indexes containing a subset of keywords from documents may also be created. Instead of scanning entire documents, the keywords in the indexes may be compared to the search term words or phrases. When a match is found the document associated with or linked to the index may be returned as the search results. This may reduce the computational time and resources used in the search.

Certain documents may be restricted or sensitive requiring a level of control or security. Such security measures may include securing a particular database or digital storage to restrict access to authorised users or systems. The particular documents may also be encrypted to prevent access or analysis without a decryption key.

However, such security measures make it difficult to carry out effective searches for such documents. For example, accessing a secure database may be difficult or not possible. Scanning encrypted documents for particular search terms or words may first require decryption of the subject information. In any case, allowing access in these ways may introduce undesirable security flaws, which may compromise the data.

Therefore, there is required a system and method that overcomes these problems.

SUMMARY OF THE INVENTION

Against this background and in accordance with a first aspect there is provided a method of searching comprising the steps of: applying a function to individual elements within a digital work to form a set of index elements; storing the index elements as an index for the digital work; receiving a search term; applying the function to one or more individual elements within the search term to convert the search term into one or more converted search term elements; identifying a digital work having an index containing one or more index elements that match one or more of the converted search term elements; and returning search results of the identified digital work. Therefore, digital works may be searched for without compromising security as the actual content of the digital work does not need to be directly viewable or readable. Access to parts of a database or storage facility may be freely available whilst retaining confidentiality of digital works or documents. Searching may be accomplished without re-converting the original digital work into plain text. The function may produce a particular pattern for each element in the digital work that may be compared with patterns generated for search terms. The function converts the individual elements within the digital work into unreadable, encrypted or scrambled and preferably unique versions of the elements.

According to a second aspect there is provided a method of searching for a digital work comprising the steps of: providing a search term; receiving search results formulated by: applying a function to one or more individual elements within the search term to convert the search term into one or more converted search term elements, and identifying a digital work having an index containing one or more index elements that match one or more of the converted search term elements, wherein the index is formed by applying the function to individual elements within the digital work to form a set of the index elements.

Preferably, the function may be an encryption function. This improves security by preventing individual element or words within the index to be converted to plaintext but still allowing free searching.

Optionally, the method may further comprise the step of forming an array of the individual elements before applying the function to the individual elements. The use of an array may improve performance, convenience and efficiency.

Preferably, the index may be stored in a database. Other types of data storage and formats may be used.

Optionally, the method may further comprise the steps of removing non-alpha or non-alphanumeric characters from the index elements and from the converted search term elements. This further improves security as it makes it more difficult to decrypt index elements. Furthermore, this reduces computer resource requirements as less data needs to be stored, compared and processed.

Preferably, the digital work may be a text document.

Optionally, non-alpha or non-alphanumeric characters may be removed from the digital work before applying the function. This further improves efficiency as non-alpha or non-alphanumeric characters are unlikely to be present in search terms.

Optionally, the index elements may further comprise joining the index elements to form a single string and then separating the single string into an array of similar length data units. This provides an index of similar length components making searching and comparing easier and quicker. This separation may occur at average pattern lengths generated by the function.

Optionally, the method may further comprise the step of replicating a predetermined length of data components found in each data unit in the following data unit in the array. This avoids creating index elements that do not contain a complete pattern or converted element relating to an element within the digital work.

Optionally, the method may further comprise the step of ensuring that the case of all characters in the index elements and converted search term elements are either all upper or all lower case. The case may be changed or checked as appropriate. This may simplify comparing as search terms may not be case sensitive. Alternatively, all letters may be converted or confirmed as upper case.

Preferably, the individual elements are words.

According to a third aspect there is provided a searchable index for a digital work formed by applying a function to individual elements within the digital work to form a set of index elements.

Preferably, the function may be a cryptographic function.

The method may be executed as a computer program comprising program instructions that, when executed on a computer cause the computer to perform the method steps described above. The computer may include desktop, laptop, server, embedded computers, integrated circuits, chips embedded in other devices or appliances (such as for example refrigerators) or other processors.

The computer program may be stored as a computer-readable medium or as a signal.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale.

DETAILED DESCRIPTION OF THE PREFERRED EMBODIMENTS

Figure 1:
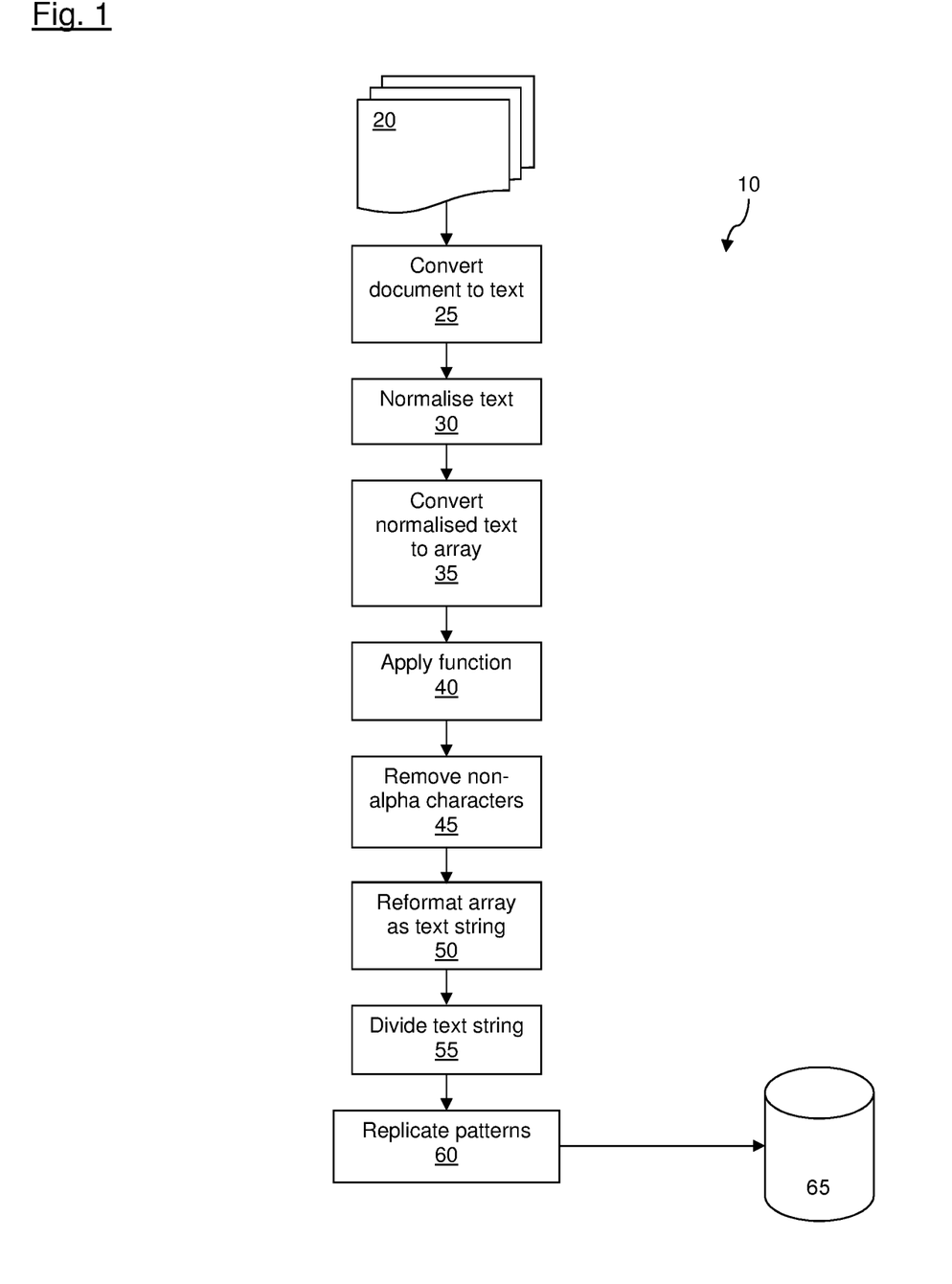
FIG. 1 shows a flowchart of a method for creating a searchable index.

A digital work may take the form of a text file or document that may be stored or transmitted electronically. The document may contain plain text in a readable and unsecured form as well as other information. FIG. 1 shows a flowchart of a method 10 for generating a searchable index for such documents 20. For each document amongst the set of documents 20 to be indexed, the method may be iterated to form an index associated or stored with each document. The first step 25 is to retrieve or convert the document 20 into text if this is not already the case. This may be achieved by stripping out all non-text information (e.g. tables, figures, formatting, etc.)

The text may be normalised at step 30. This step may involve removing any punctuation and/or changing the case of the text to either or all capital or all lower case. The words in the resultant text may be converted to an array at step 35.

Once in an array, each word may be accessed and processed individually. At step 40 a function is applied to each word in the array. This function may be a cryptographic function to convert the plaintext word into ciphertext pattern. A suitable function may be, for example, the RSA algorithm. In other words, rather than applying a function to the entire document, each individual word is processed to form an index element. Therefore, identical words will provide an identical conversion result or pattern.

A new array of converted words or elements may be formed. At step 45, all non-alpha or non-alphanumeric characters may be removed from each converted array element so that only a-z characters remain in the text pattern. This step may also include changing the case of the characters to all lowercase, for example.

Certain space limits may be applied by a database storing the index. It may also be more computationally efficient to search an index contain elements of a similar size. Steps 50, 55 and 60 may be used to format the index for these requirements. At step 50, a continuous single text string is generated from the array of index elements to form a continuous or flowing document such as a text string. For larger documents it may not be possible or desirable to store this resultant text string as the searchable index. Therefore, this text string may be divided into similar, substantially equal or exactly equal lengths at step 55, with each divided component forming one item in a new array. In order to avoid splitting patterns derived from one word or element across different array elements (and potentially excluding words or elements from a search), a portion of the last characters of one array element may be repeated or replicated at the end of the previous array element. This may be typically the length of two patterns generated from two or more words (a single word length equivalent pattern may also be used). Each of the array elements may be placed into a text field within a database 65.

These full text fields within the database 65 may be associated or stored with a reference to the originating document or digital work 20 forming an index. Other index structures may be used.

The following provides a worked example of the method 10 for generating the searchable index. In this example, the text forming the document is shown in table 1.

TABLE 1

Lorem ipsum dolor sit amet,
consectetur elit, sed do uiusmod
tempor incididunt ut labore et
dolor magna aliqua. Ut enim ad
minim veniam, quis nostrud
exercitation ullamco laboris This text contains punctuation, carriage returns and other formatting characters. The text from this document may be extracted at step 25 and then normalised to remove any non-alpha characters and convert any upper case letters to lower case resulting in a set of separate words, i.e.:

lorem ipsum dolor sit amet consectetur elit sed do eiusmond tempor incididunt ut labore et dolore magna aliqua ut enim ad minim veniam quis nostrud exercitation ullamco laboris At step 35 the words may be separated to form separate elements of an array. The array numbers are provided for illustrative purposes and may be used to address each element in the array. This array is shown in table 2.

TABLE 2

| | |
|---|---|
| 1 | lorem |
| 2 | ipsum |
| 3 | dolor |
| 4 | sit |
| 5 | amet |
| 6 | consectetur |
| 7 | elit |
| 8 | sed |
| 9 | do |
| 10 | eiusmond |
| 11 | tempor |
| 12 | incididunt |
| 13 | ut |
| 14 | labore |
| 15 | et |
| 16 | dolore |
| 17 | magna |
| 18 | aliqua |
| 19 | ut |
| 20 | enim |
| 21 | ad |
| 22 | minim |
| 23 | veniam |
| 24 | quis |
| 25 | nostrud |
| 26 | exercitation |
| 27 | ullamco |
| 28 | laboris |

Step 40 applies a function, such as a cryptographic function, to each element in the array with the resulting encrypted or converted words shown in table 3.

TABLE 3

| | |
|---|---|
| 1 | l/flu9jUD6__xSDDM?ZWu8WSp1wZNA9pwmbauZ4rxpWJ5LoPzogLK/E5rPIftI5njPOdyGOtiiiuaXcq4vCunyOre4sg==0W4PbO3kKKwu4w== |
| 2 | ELWR29CwD6__xSDDM?rViDy3QlpUeU7lxOUn9pQ93Vmpz//QVaedyUx3DJj6qdLAYI4TeZXoRhhCKZRdR91vw0gf9WCA==dtC2vRFaIQp3kA== |
| 3 | zzX/m9ktD6__xSDDM?OqiVA4g1vaT5zY0p6lx0l6mMMW1O6b44s01WUUxdd1cj825JK0iytYz4WR4ym3V/7QIutwioHg==kWxKNjT7dDbWYg== |
| 4 | P9liT/ZvD6__xSDDM?wEpXOGMHBw1tluaLIdHLnWhjo8C10dcJg1hGorNg4sG0DFwVd8ATzxmSUDEVCV2/9vlleekFEw==V6Z2iMEeuYrcOw== |
| 5 | QvzZbn4KD6__xSDDM?bcxbOQ86uZ8QTEwpGwYS/ZxGxfLqPCgCSLI6auc+PcJPCf/WzdH61PuYNDCkCC1ELtUg5E9rBQ==IoE7xPOWMlSWpQ== |
| 6 | MwUfeV2/D6__xSDDM?Kav7sdYJFKa0tRb1DTgIu+muHUtxptZDEGq3R23GwBRvUKSHeS/Gypc6rWsDOg0F6+ls6kEpQQ==LDQdN9AKyRkn+A== |
| 7 | 6xY0UICJD6__xSDDM?imp2yhCfb7WUHy8/rXLNfyyN2eg2OfQ/IgtA8dyn0+TQBpdIS8NJ2VtLK1bRdKP/nSeFdRWM0g==AyrV8mLAiw/fRA== |
| 8 | ih9N6W02D6__xSDDM?QtjI+pweKSTK7nwqc5SyHk3/hK94z5LoqWwbO8EFLLdFSwT5TSCoXLROdBwJ2oiQZtTOMZJPbw==D+OwxH9ZyHhN0Q== |
| 9 | gUOyb9m9D6__xSDDM?F88Bgkx4GXaPxaDuSv8EZFzfzjQ/rBua2IOKJumUIbqhmHrka00r4a10H5WkBxUAqp5F+psgBA==R8UMoS6rIZZZlg== |
| 10 | IDyq1ZJ6D6__xSDDM?3C1w2Fpjd0CsfcXLHnTu9GtR+c3japU3FgsO8KYZ4HHoWjMDk8sHkEGnd3P570QGnLDK9LTLVQ==QdqtTYS0SBp+Tg== |
| 11 | eAgxfBw1D6__xSDDM?f3X7mohNMqREsZjGwH9+B5aRLdAvD0yZG0dBoqUlQHHd60L2XW8u7ohnnyQMRb9FM0iSGR1u6Q==vkP9DoCbzxM3eA== |
| 12 | sDj9CtNjD6__xSDDM?AADUqLgPIaGMStF502u5rTd1XU9f73WneZ7zwr0ncHZH4NLOJ0c00tfG9GcU4had8/EzQIDXwQ==7uEB/k2tgOFoPQ== |
| 13 | +ecjv1ZqD6__xSDDM?FXyZmZHGkBdwqWTB09enitcm1P+2a3/Z5WVRxmCwMAAQ9qzHYn6I7+fKHuRV708tYeFr2SFgcg==keKR3XXw9vuMcA== |
| 14 | bgsysBoyD6__xSDDM?XGA7vhZRZDl7IoQCWCcVhY9AafnY7jGRuKMh5MUyG6Fm/adqZwtGKbrZ40huOxnbbDOC+tNPrQ==Kx8GQqFWg4br+g== |
| 15 | 1FqQgrX8D6__xSDDM?Y0aGiOfqCOGY5RSFC0ZwYH0mRgWab6eX3szptn2xIToFodXzN33sDjGDAlx3GbIUULSB2U0LFA==6/kuwu9MwSLPSg== |
| 16 | aphtqN8TD6__xSDDM?h1XP5AEr65u3fe2F3I8p4StpKfP3UbKBK9Exkj2up9bBj1n+ePDP4vSDZBqwFGwTqqlWNuxEBg==p8x3RkgDnfl o8Q== |
| 17 | qAs8mOrVD6__xSDDM?SQp+osrdb8qwZC1GwxPNPwT7X2FPkVI1xkVAaFM81EM399lRqpTUCSxaquBtClzJsgEWoUXkQg==gCiUZh6pEsD2SQ== |
| 18 | ujBRzxyOD6__xSDDM?z0R/IJsnUiROXOu8FRjhMrfW6hAQsSJFwFjnf+Z/uQ6jZ1JV4pi0RNK/6PSXPnt2VDnuowWfPQ==PVzsBZdJDkqs4A== |
| 19 | Cl8HBtSgD6__xSDDM?VPSM3WXOp5E9jdUThJJZqeawoD3Rr930WxDAY8TClKiiPd8/G1sLNlju3MPkEkgdbj/o0L8kGw==UiuHmrNc5OTzuw== |
| 20 | Khzg3VmTD6__xSDDM?0P2IOY1qT0igNULyJHjyC7DuQtDBck5Xpsc5oNN8l5Q+6Wkq+qAovcPZwJV1r9zxYaasPRJvdw==PDvuYd3deB4b3g== |
| 21 | SyxcbAbPD6__xSDDM?rPVPm9vncEdUQyvlyANNRwJl9/iDFsIZ/UllpZcz4/Rs41+EeXKFpqQcSLObFNnfTE6aEZZpCw==rSkYU5kaSjtPNA== |
| 22 | MOG6qqLnD6__xSDDM?yCW4tSH6cmaHjdl1Ddt3irnsLHv5prkZTHxL1MiNoBjsMgArix/RKWYGoMeKJuVfDfVRRRiaqw==w/4FEpKTH2xw/A== |
| 23 | MsTrvD58D6__xSDDM?G3oQQw7D1su9ksI2VPuME+XuiUyLYBfFiIxmBdyFL+nMz8RF23EdtvGd6EgHZraJNePRPIw5LA==OAK7c7k4dOYEHA== |
| 24 | zr0ND6uYD6__xSDDM?QpSNmKuAAPWFcHvX4S1jqL01eTo/yOmPJ6SJ4U1Vh6O1ZcZOAh3v2B+5KXWyI1AkiwOhNUCi/Q==S2y0ADzPDR++bA== |
| 25 | hVbnCqcID6__xSDDM?2jchbbKRyV17lnQQExpyofJdvxt1peYBAn+o4OyyYsSK8HJr4j81UDa0ffZl8MGiA7wPkt9sAQ==yml4EyVOu8geuA== |
| 26 | wr1cTD64D6__xSDDM?DmCDWXbjCj8mY8tmM2zq+98mB5V9ci3mpR4L4TNGZnOWri67P3mLg0QDjV7pBGyNEQF8Q2rywg==5GICYdedRmACCA== |
| 27 | rFdysIxeD6__xSDDM?tWOgE6ZbWtsW204rmKumGaBo2DaCOG1qa8ot7OuzeSMDo9wlAbKMT8AbloVDCU+kOyx2QA5qxg==vEIzqUnSr+u/Gg== |
| 28 | rSI8U8AxD6__xSDDM?2w4ORWCkuzAnKBaNGG9STeIsZiI7b8MPgCGy9quz1Y+lfoMgvcVPfZf7C/oBVEFnaMamNx/RIw==3RbKBfzKE72GUQ== |

Any non-alpha characters are removed from each array element and the case of any upper case letters is changed to lower case during normalisation step 45. The results of this processing are shown as table 4.

TABLE 4

| | |
|---|---|
| 1 | lflujudxsddmzwuwspwznapwmbauzrxpwjlopzoglkerpiftinjpodygotiiiuaxcqvcunyoresgwpbokkkwuw |
| 2 | elwrcwdxsddmrvidyqlpueulxounpqvmpzqvaedyuxdjjqdlayitezxorhhckzrdrvwgfwcadtcvrfaiqpka |
| 3 | zzxmktdxsddmoqivagvatzyplxlmmmwobswuuxddcjjkiytyzwrymvqiutwiohgkwxknjtddbwyg |
| 4 | plitzvdxsddmwepxogmhbwtlualidhlnwhjocdcjghgorngsgdfwvdatzxmsudevcvvlleekfewvzimeeuyrcow |
| 5 | qvzzbnkdxsddmbcxboquzqtewpgwyszxgxflqpcgcsliaucpcjpcfwzdhpuyndckcceltugerbqioexpowmlswpq |
| 6 | mwufevdxsddmkavsdyjfkatrbdtgiumuhutxptzdegqrgwbrvukshesgypcrwsdogflskepqqldqdnakyrkna |
| 7 | xyuicjdxsddmimpyhcfbwuhyrxlnfyynegofqigtadyntqbpdisnjvtlkbrdkpnsefdrwmgayrvmlaiwfra |
| 8 | ihnwdxsddmqtjipwekstknwqcsyhkhkzloqwwboeflldfswttscoxlrodbwjoiqzttomzjpbwdowxhzyhhnq |
| 9 | guoybmdxsddmfbgkxgxapxadusvezfzfzjqrbuaiokjumuibqhmhrkarahwkbxuaqpfpsgbarumosrizzzlg |

TABLE 4-continued

```
10  idyqzjdxsddmcwfpjdcsfcxlhntugtrcjapufgsokyzhhowjmdkshkegndpqgnldkltlvqqdqttyssbptg
11  eagxfbwdxsddmfxmohnmqreszjgwhbarldavdyzgdboqulqhhdlxwuohnnyqmrbfmisgruqvkpdocbzxmea
12  sdjctnjdxsddmaaduqlgpiagmstfurtdxufwnezzwrnchzhnlojctfggcuhadezqidxwquebktgofopq
13  ecjvzqdxsddmfxyzmzhgkbdwqwtbenitcmpazwvrxmcwmaaqqzhynifkhurvtyefrsfgcgkekrxxwvumca
14  bgsysboydxsddmxgavhzrzdlioqcwccvhyaafnyjgrukmhmuygfmadqzwtgkbrzhuoxnbbdoctnprqkxgqqfwgbrg
15  fqqgrxdxsddmyagiofqcogyrsfczwyhmrgwabexszptnxitofodxznsdjgdalxgbiuulsbulfakuwumwslpsg
16  aphtqntdxsddmhxpaerufefipstpkfpubkbkexkjupbbjnepdpvsdzbqwfgwtqqlwnuxebgpxrkgdnfoq
17  qasmorvdxsddmsqposrdbqwzcgwxpnpwtxfpkvixkvaafmemlrqptucsxaqubtclzjsgewouxkqggciuzhpesdsq
18  ujbrzxyodxsddmzrijsnuiroxoufrjhmrfwhaqssjfwfjnfzuqjzjvpirnkpsxpntvdnuowwfpqpvzsbzdjdkqsa
19  clhbtsgdxsddmvpsmwxopejduthjjzqeawodrrwxdaytclkiipdgslnljumpkekgdbjolkgwuiuhmrncotzuw
20  khzgvmtdxsddmpioyqtignulyjhjycduqtdbckxpsconnlqwkqqaovcpzwjvrzxyaasprjvdwpdvuyddebbg
21  syxcbabpdxsddmrpvpmvnceduqyvlyannrwjlidfsizullpzczrseexkfpqqcslobfnnfteaezzpcwrskyukasjtpna
22  mogqqlndxsddmycwtshcmahjdlddtirnslhvprkzthxlminobjsmgarixrkwygomekjuvfdfvrrriaqwwfepkthxwa
23  mstrvddxsddmgoqqwdsuksivpumexuiuylybffiixmbdyflnmzrfedtvgdeghzrajneprpiwlaoakckdoyeha
24  zrnduydxsddmqpsnmkuaapwfchvxsjqletoyompjsjuvhozczoahvbkxwyiakiwohnuciqsyadzpdrba
25  hvbncqcidxsddmjchbbkryvlnqqexpyofjdvxtpeybanooyyysskhjrjudaffzlmgiawpktsaqymleyvougeua
26  wrctddxsddmdmcdwxbjcjmytmmzqmbvcimprltngznowripmlgqdjvpbgyneqfqrywggicydedrmacca
27  rfdysixedxsddmtwogezbwtswrmkumgabodacogqaotouzesmdowlabkmtablovdcukoyxqaqxgveizqunsrugg
28  rsiuaxdxsddmworwckuzankbanggsteisziibmpgcgyquzylfomgvcvpfzfcobvefnamamnxriwrbkbfzkeguq
```

Table 4 shows an array of index elements. Further processing may be carried out to facilitate easier or more effective searching. At step 50 each index element in the array may be joined together to form a flowing text of characters forming a character string as shown below:

lflujudxsddmzwuwspwznapwmbauzrxpwjlopzoglkerpiftinjpodygotiiiivaxcqvcunyoresgwpbokkk kwuwelwrcwdxsddmrvidyqlpueulxounpqvmpzqvaedyuxdjjqdlayitezxorhhckzrdrvwgfwcadtcvrfaiqpkazz xmktdxsddmoqivagvatzyplxlmmmwobswuuxddcjjkiytyzwrymvqiutwiohgkwxknjtddbwygplitzvdxsddmwepx ogmhbwtlualidhlnwhjocdcjghgorngsgdfwvdatzxmsudevcvvlleekfewvzimeeuyrcowqvzzbnkdxsddmbcxboq uzqtewpgwyszxgxflqpcgcsliaucpcjpcfwzdhpuyndckccelt­ugerbqioexpowmlswpqmwufevdxsddmkaysdyjfk atrbdtgiumuhutxptzdegqrgwbrvukshesgyperwsdogfslskepqqldqdnakyrknaxyuicjdxsddmimpyhcfbwuhyrx lnfyynegofqigtadyntqbpdisnjvtlkbrdkpnsefdrwmgayrvmlaiwfraihnwdxsddmqtjipwekstknwqcsyhkhkzl oqwwboefllddfswttscoxlrodbwjoiqzttomzjpbwdowxhzyhhnqguoybmdxsddmfbgkxgxapxadusvezfzfzjqrbua iokjumuibqhmhrkarahwkbxuaqpfpsgbarumosrizzzlgidyqzjdxsddmcwfpjdcsfcxlhntugtrcjapufgsokyzhh owjmdkshkegndpqgnldkltivqqdqttyssbptgeagxfbwdxsddmfxmohnmqreszjgwhbarldavdyzgdboqulqhhdlxw uohnnyqmrbfmisgruqvkpdocbzxmeasdjctnjdxsddmaaduqlgpiagmstfurtdxufwnezzwrnchzhnlojctfggcuha dezqidxwquebktgofopqecjvzqdxsddmfxyzmzhgkbdwqwtbenitcmpazwvrxmcwmaaqqzhynifkhurvtyefrsfgcg kekrxxwvumcabgsysboydxsddmxgavhzrzdlioqcwccvhyaafnyjgrukmhmuygfmadqzwtgkbrzhuoxnbbdoctnprq kxgqqfwgbrgfqqgrxdxsddmyagiofqcogyrsfczwyhmrgwabexszptnxitofodxznsdjgdalxgbiuulsbulfakuwum wslpsgaphtqntdxsddmhxpaerufefipstpkfpubkbkexkjupbbjnepdpvsdzbqwfgwtqqlwnuxebgpxrkgdnfoqqas morvdxsddmsqposrdbqwzcgwxpnpwtxfpkvixkvaafmemlrqptucsx­aqubtclzjsgewouxkqggciuzhpesdsqujbrz xyodxsddmzrijsnuiroxoufrjhmrfwhaqssjfwfjnfzuqjzjvpirnkpsxpntvdnuowwfpqpvzsbzdjdkqsaclhbtsg dxsddmvpsmwxopejduthjjzqeawodrrwxdaytclkiipdgslnljumpkekgdbjolkgwuiuhmrncotzuwkhzgvmtdxsdd mpioyqtignulyjhjycduqtdbckxpsconnlqwkqqaovcpzwjvrzxyaasprjvdwpdvuyddebbgsyxcbabpdxsddmrpvp mvnceduqyvlyannrwjlidfsizullpzczrseexkfpqqcslobfnnfteaezzpcwrskyukasjtpnamogqqlndxsddmycwt shcmahjdlddtirnslhvprkzthxlminobjsmgarixrkwygomekjuvfdfvrrriaqwwfepkthxwamstrvddxsddmgoqqw dsuksivpumexuiuylybffiixmbdyflnmzrfedtvgdeghzrajneprpiwlaoakckdoyehazrnduydxsddmqpsnmkuaap wfchvxsjqletoyompjsjuvhozczoahvbkxwyiakiwohnuciqsy­adzpdrbahvbncqcidxsddmjchbbkryvinqqexpyo fjdvxtpeybanooyyysskhjrjudaffzlmgiawpktsaqymleyvougeuawrctddxsddmdmcdwxbjcjmytmmzqmbvcimpr ltngznowripmlgqdjvpbgyneqfqrywggicydedrmaccarfdysixedxsddmtwogezbwtswrmkumgabodacogqaotouz esmdowlabkmtablovdcukoyxqaqxgveizqunsruggrsivaxdxsddmworwckuzankbanggsteisziibmpgcgyquzylf omgvcvpfzfcobvefnamamnxriwrbkbfzkeguqvbnhydxsddmbhwmcmnpmtrctpnarznxrjjzcgtvzfpvdrdmndxbv zwaujvxmpjjwgeogrsjniogqawutmdkaa This text string may be divided into substantially or exactly same length text strings at step 55 to be stored as new index elements. However, so that each new index element contains the converted characters from at least one word, the last one or two patterns at the end of each index element may be repeated at the end of the previous index element at step 60 as shown in table 5 (for reasons of presentation, only two word patterns are shown in each row of this table, i.e. the second repeated pattern is omitted).

Therefore, table 5 shows a representation of a searchable index stored in database 65. The spaces in each index element illustrate the start of each pattern but will not necessarily be stored in the database 65.

TABLE 5

```
1  Lflujudxsddmzwuwspwznapwmbauzrxpwjlopzoglkerpiftinjpodygotiiiiuaxcqvcunyoresgwpbokkkwuw
   elwrcwdxsddmrvidyqlpueulxounpqvmpzqvaedyuxdjjqdlayitezxorhhckzrdrvwgfwcadtcvrfaiqpka
2  elwrcwdxsddmrvidyqlpueulxounpqvmpzqvaedyuxdjjqdlayitezxorhhckzrdrvwgfwcadtcvrfaiqpka
   zzxmktdxsddmoqivagvatzyplxlmmmwobswuuxddcjjkiytyzwrymvqiutwiohgkwxknjtddbwyg
3  zzxmktdxsddmoqivagvatzyplxlmmmwobswuuxddcjjkiytyzwrymvqiutwiohgkwxknjtddbwyg
   plitzvdxsddmwepxogmhbwtlualidhlnwhjocdcjghgorngsgdfwvdatzxmsudevcvvlleekfewvzimeeuyrcow
4  piitzvdxsddmwepxogmhbwtlualidhlnwhjocdcjghgorngsgdfwvdatzxmsudevcvvlleekfewvzimeeuyrcow
   qvzzbnkdxsddmbcxboquzqtewpgwyszxgxflqpcgcsliaucpcjpcfwzdhpuyndckcceltugerbqioexpowmlswpq
```

TABLE 5-continued

```
 5  qvzzbnkdxsddmbcxboquzqtewpgwyszxgxflqpcgcsliaucpcjpcfwzdhpuyndckcceltugerbqioexpowmlswpq
    mwufevdxsddmkavsdyjfkatrbdtgiumuhutxptzdegqrgwbrvukshesgypcrwsdogflskepqqldqdnakyrkna
 6  mwufevdxsddmkavsdyjfkatrbdtgiumuhutxptzdegqrgwbrvukshesgypcrwsdogflskepqqldqdnakyrkna
    xyuicjdxsddmimpyhcfbwuhyrxlnfyynegofqigtadyntqbpdisnjvtlkbrdkpnsefdrwmgayrvmlaiwfra
 7  xyuicjdxsddmimpyhcfbwuhyrxlnfyynegofqigtadyntqbpdisnjvtlkbrdkpnsefdrwmgayrvmlaiwfra
    ihnwdxsddmqtjipwekstknwqcsyhkhkzloqwwboeflldfswttscoxlrodbwjoiqzttomzjpbwdowxhzyhhnq
 8  ihnwdxsddmqtjipwekstknwqcsyhkhkzloqwwboeflldfswttscoxlrodbwjoiqzttomzjpbwdowxhzyhhnq
    guoybmdxsddmfbgkxgxapxadusvezfzfzjqrbuaiokjumuibqhmhrkarahwkbxuaqpfpsgbarumosrizzzlg
 9  guoybmdxsddmfbgkxgxapxadusvezfzfzjqrbuaiokjumuibqhmhrkarahwkbxuaqpfpsgbarumosrizzzlg
    idyqzjdxsddmcwfpjdcsfcxlhntugtrcjapufgsokyzhhowjmdkshkegndpqgnldkltlvqqdqttyssbptg
10  idyqzjdxsddmcwfpjdcsfcxlhntugtrcjapufgsokyzhhowjmdkshkegndpqgnldkltlvqqdqttyssbptg
    eagxfbwdxsddmfxmohnmqreszjgwhbarldavdyzgdboqulqhhdlxwuohnnyqmrbfmisgruqvkpdocbzxmea
11  eagxfbwdxsddmfxmohnmqreszjgwhbarldavdyzgdboqulqhhdlxwuohnnyqmrbfmisgruqvkpdocbzxmea
    sdjctnjdxsddmaaduqlgpiagmstfurtdxufwnezzwrnchzhnlojctfggcuhadezqidxwquebktgofopq
12  sdjctnjdxsddmaaduqlgpiagmstfurtdxufwnezzwrnchzhnlojctfggcuhadezqidxwquebktgofopq
    ecjvzqdxsddmfxyzmzhgkbdwqwtbenitcmpazwvrxmcwmaaqqzhynifkhurvtyefrsfgcgkekrxxwvumca
13  ecjvzqdxsddmfxyzmzhgkbdwqwtbenitcmpazwvrxmcwmaaqqzhynifkhurvtyefrsfgcgkekrxxwvumca
    bgsysboydxsddmxgavhzrzdlioqcwccvhyaafnyjgrukmhmuygfmadqzwtgkbrzhuoxnbbdoctnprqkxgqqfwgbrg
14  bgsysboydxsddmxgavhzrzdlioqcwccvhyaafnyjgrukmhmuygfmadqzwtgkbrzhuoxnbbdoctnprqkxgqqfwgbrg
    fqqgrxdxsddmyagiofqcogyrsfczwyhmrgwabexszptnxitofodxznsdjgdalxgbiuulsbulfakuwumwslpsg
15  fqqgrxdxsddmyagiofqcogyrsfczwyhmrgwabexszptnxitofodxznsdjgdalxgbiuulsbulfakuwumwslpsg
    aphtqntdxsddmhxpaerufefipstpkfpubkbkexkjupbbjnepdpvsdzbqwfgwtqqlwnuxebgpxrkgdnfoq
16  aphtqntdxsddmhxpaerufefipstpkfpubkbkexkjupbbjnepdpvsdzbqwfgwtqqlwnuxebgpxrkgdnfoq
    qasmorvdxsddmsqposrdbqwzcgwxpnpwtxfpkvixkvaafmemlrqptucsxaqubtclzjsgewouxkqggciuzhpesdsq
17  qasmorvdxsddmsqposrdbqwzcgwxpnpwtxfpkvixkvaafmemlrqptucsxaqubtclzjsgewouxkqggciuzhpesdsq
    ujbrzxyodxsddmzrijsnuiroxoufrjhmrfwhaqssjfwfjnfzuqjzjvpirnkpsxpntvdnuowwfpqpvzsbzdjdkqsa
18  ujbrzxyodxsddmzrijsnuiroxoufrjhmrfwhaqssjfwfjnfzuqjzjvpirnkpsxpntvdnuowwfpqpvzsbzdjdkqsa
    clhbtsgdxsddmvpsmwxopejduthjjzqeawodrrwxdaytclkiipdgslnljumpkekgdbjolkgwuiuhmrncotzuw
19  clhbtsgdxsddmvpsmwxopejduthjjzqeawodrrwxdaytclkiipdgslnljumpkekgdbjolkgwuiuhmrncotzuw
    khzgvmtdxsddmpioyqtignulyjhjycduqtdbckxpsconnlqwkqqaovcpzwjvrzxyaasprjvdwpdvuyddebbg
20  khzgvmtdxsddmpioyqtignulyjhjycduqtdbckxpsconnlqwkqqaovcpzwjvrzxyaasprjvdwpdvuyddebbg
    syxcbabpdxsddmrpvpmvnceduqyvlyannrwjlidfsizullpzczrseexkfpqqcslobfnnfteaezzpcwrskyukasjtpna
21  Syxcbabpdxsddmrpvpmvnceduqyvlyannrwjlidfsizullpzczrseexkfpqqcslobfnnfteaezzpcwrskyukasjtpna
    mogqqlndxsddmycwtshcmahjdlddtirnslhvprkzthxlminobjsmgarixrkwygomekjuvfdfvrrriaqwwfepkthxwa
22  mogqqlndxsddmycwtshcmahjdlddtirnslhvprkzthxlminobjsmgarixrkwygomekjuvfdfvrrriaqwwfepkthxwa
    mstrvddxsddmgoqqwdsuksivpumexuiuylybffiixmbdyflnmzrfedtvgdeghzrajneprpiwlaoakckdoyeha
23  mstrvddxsddmgoqqwdsuksivpumexuiuylybffiixmbdyflnmzrfedtvgdeghzrajneprpiwlaoakckdoyeha
    zrnduydxsddmqpsnmkuaapwfchvxsjqletoyompjsjuvhozczoahvbkxwyiakiwohnuciqsyadzpdrba
24  zrnduydxsddmqpsnmkuaapwfchvxsjqletoyompjsjuvhozczoahvbkxwyiakiwohnuciqsyadzpdrba
    hvbncqcidxsddmjchbbkryvlnqqexpyofjdvxtpeybanooyyysskhjrjudaffzlmgiawpktsaqymleyvougeua
25  hvbncqcidxsddmjchbbkryvlnqqexpyofjdvxtpeybanooyyysskhjrjudaffzlmgiawpktsaqymleyvougeua
    wrctddxsddmdmcdwxbjcjmytmmzqmbvcimprltngznowripmlgqdjvpbgyneqfqrywggicydedrmacca
26  wrctddxsddmdmcdwxbjcjmytmmzqmbvcimprltngznowripmlgqdjvpbgyneqfqrywggicydedrmacca
    rfdysixedxsddmtwogezbwtswrmkumgabodacogqaotouzesmdowlabkmtablovdcukoyxqaqxgveizqunsrugg
27  rfdysixedxsddmtwogezbwtswrmkumgabodacogqaotouzesmdowlabkmtablovdcukoyxqaqxgveizqunsrugg
    rsiuaxdxsddmworwckuzankbanggsteisziibmpgcgyquzylfomgvcvpfzfcobvefnamamnxriwrbkbfzkeguq
28  rsiuaxdxsddmworwckuzankbanggsteisziibmpgcgyquzylfomgvcvpfzfcobvefnamamnxriwrbkbfzkeguq
    vbnhydxsddmbhwmwcmnpmtrctpnarznxrjjzcgtvzfpvdrdmndxbvzwaujvxmpjjwgeogrsjniogqawutmdkaa
```

Figure 2:
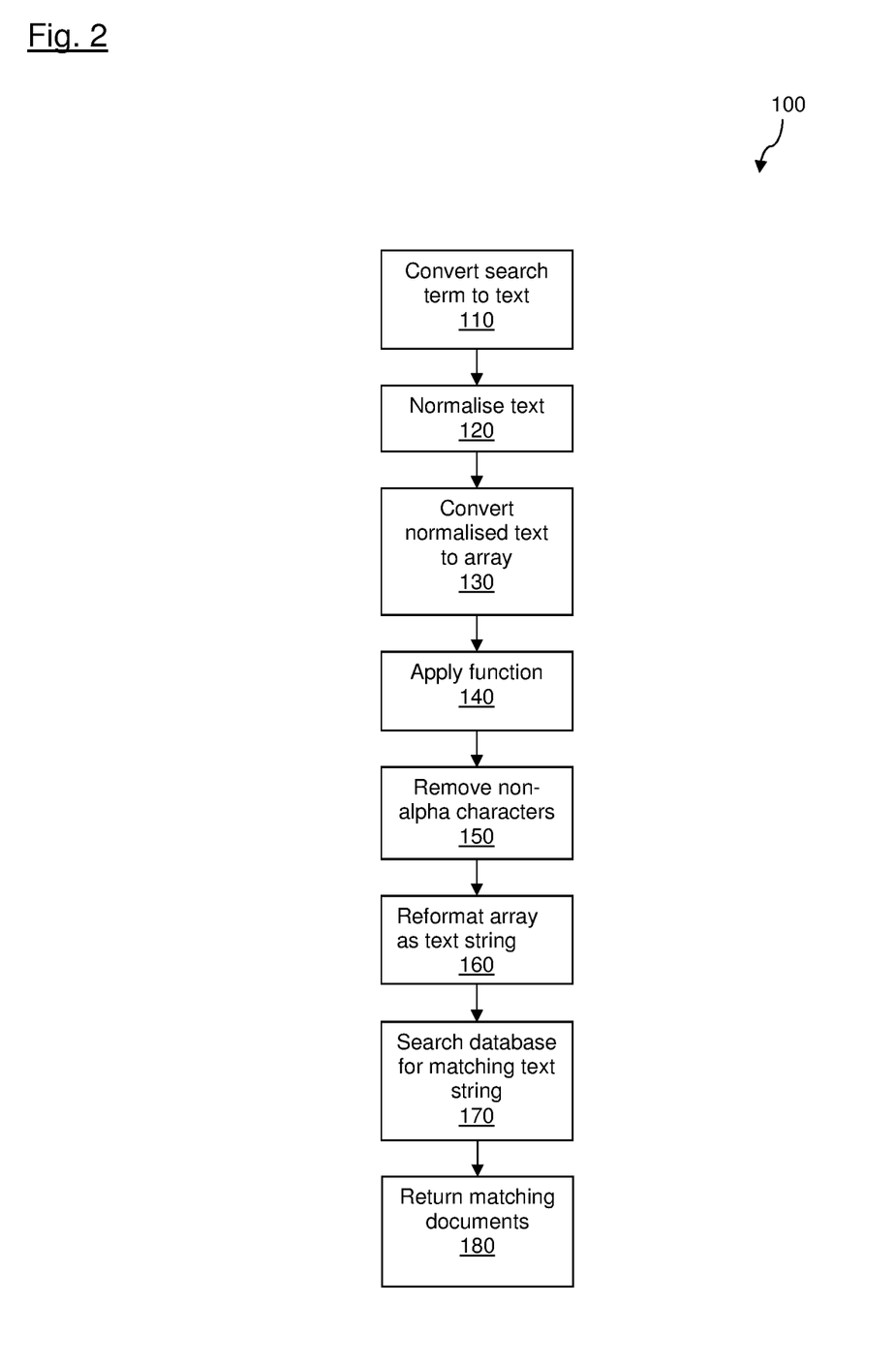
FIG. 2 shows a flowchart of a method for searching a database using the searchable index of FIG. 1.

FIG. 2 shows a method 100 for creating a search pattern from a search term originating from a user or computer system. Such a search pattern may be used to search the index created in method 10 as plaintext search terms will no longer be matchable with the index shown in table 5 after the procedure described with reference to FIG. 1 has been carried out. This method 100 is similar to the method used to create the index and uses the same or similar functions to convert individual words or phrases within the search term, which are then used as a comparison of the elements within the database 65.

A received search term is converted to text, if necessary at step 110. A similar normalisation procedure is carried out at step 120 in which any non-alpha characters and punctuation are removed, leaving individual words in lowercase. The words in this normalised text are converted to an array at step 130. Each word in this array has a function applied to it at step 140 and this function is the same as that used in step 40 of method 10. The resultant patterns or converted search term elements may be handled as a new array.

At step 150, any non-alpha characters are removed from each array element (similar to step 45 in method 10) making it easier to handle and search for matching patterns.

At step 160, the patterns are reformatted as a flowing document or continuous text string. This text string is then compared with the index elements in the searchable index within database 65 to identify any matches or partial matches. When a match is identified (i.e. an index element is found to contain a search term element), then the identified associated or linked document or digital work is returned at step 180.

Individual words or phrases may be searched for in this way or separate searches may be achieved for each word within a search term, for example.

The following worked example illustrates the steps of method 100 for generating a search term for querying the searchable index generated by executing method 10.

For example, the search term acquired at step 110 may be:

aliqua. Ut enim

Normalisation of this search term (step 120) results in the text:

aliqua ut enim

This text may be converted to an array at step 130 and shown in table 6. Each element in the search array may be formed from an element or word from the search term.

TABLE 6

| | |
|---|---|
| 1 | aliqua |
| 2 | ut |
| 3 | enim |

The function or cryptographic algorithm may be applied at step 140 to each element in the array to form a pattern corresponding to each word forming a converted array or search element shown in table 7.

TABLE 7

1  ujBRzxyOD6_xSDDM?z0R/IJsnUiROXOu8FRjhMrfW6hAQsSJFwFjnf+Z/uQ6jZ1JV4pi0RNK/6PSXPnt2VDnuowWfPQ==PVzsBZdJDkqs4A==
2  Cl8HBtSgD6_xSDDM?VPSM3WXOp5E9jdUThJJZqeawoD3Rr930WxDAY8TClKiiPd8/G1sLNlju3MPkEkgdbj/o0L8kGw==UiuHmrNc5OTzuw==
3  Khzg3VmTD6_xSDDM?0P2IOY1qT0igNULyJHjyC7DuQtDBck5Xpsc5oNN8l5Q+6Wkq+qAovcPZwJV1r9zxYaasPRJvdw==PDvuYd3deB4b3g==

At step 150 any non-alpha characters may be removed from each individual element in the search term array. All upper case characters may also be converted to lower case to simplify the search. This results in the array illustrated in table 8.

TABLE 8

1  ujbrzxyodxsddmzrijsnuiroxoufrjhmrfwhaqssjfwfjnfzuqjzjvpirnkpsxpntvdnuowwfpqpvzsbzdjdkqsa
2  clhbtsgdxsddmvpsmwxopejduthjjzqeawodrrwxdaytclkiipdgslnljumpkekgdbjolkgwuiuhmrncotzuw
3  khzgvmtdxsddmpioyqtignulyjhjycduqtdbckxpsconnlqwkqqaovcpzwjvrzxyaasprjvdwpdvuyddebbg Each pattern or search element may be joined together to form a single text string as shown below:
ujbrzxyodxsddmzrijsnuiroxoufrjhmrfwhaqssjfwfjnfzuqjzjvp irnkpsxpntvdnuowwfpqpvzsbzdjdkqsaclhbtsqdx-sddmvpsmwxopejduth jjzqeawodrrwxdaytclkiipdqsln-ljumpkekqdbjolkqwuiuhmrncotzuwkh zgvmtdxsddmpioyqtignulyjhjycduqtdbckxpsconn-lqwkqqaovcpzwjvrz xyaasprjvdwpdvuyddebbg This search string may then be compared with each element of the searchable index illustrated by table 5. In this particular example a match is found in element number 18 (see table 5) as this element in the index corresponds with words 18-20 of the original text document. Therefore, the document (i.e. the contents of table 1) may be returned as the results of the search at step 180. Several searchable indexes may be compared in this way. The search results may comprise the actual document, a link or pointer to the document or a list of such documents.

This method describes a search for a particular phrase or group or words. However, individual words may also be used in a search without the need for step 160. Alternatively, separate comparisons may be made for each element or word in a search terms so that a match of any word (but not necessarily all words) may return the document. Suitable searching techniques are described in WO2009/112862, for example.

The replication used to generate the index (e.g. that shown in table 5) also allows groups of words or phrases to be searched without carrying out individual word based searches, as a converted phrase may be stored as a single index element. Replication also allows simultaneous searches for different word orders within a particular phrase. For example, searching for "aliqua ut enim" also returns the results of a search for "ut enin aliqua" (row 19 of table 5) and "enin aliqua ut" (row 20 of table 5). Therefore, performance may be improved. Replication also makes it more difficult for an unauthorized user to regenerate the entire document from its index.

Figure 3:
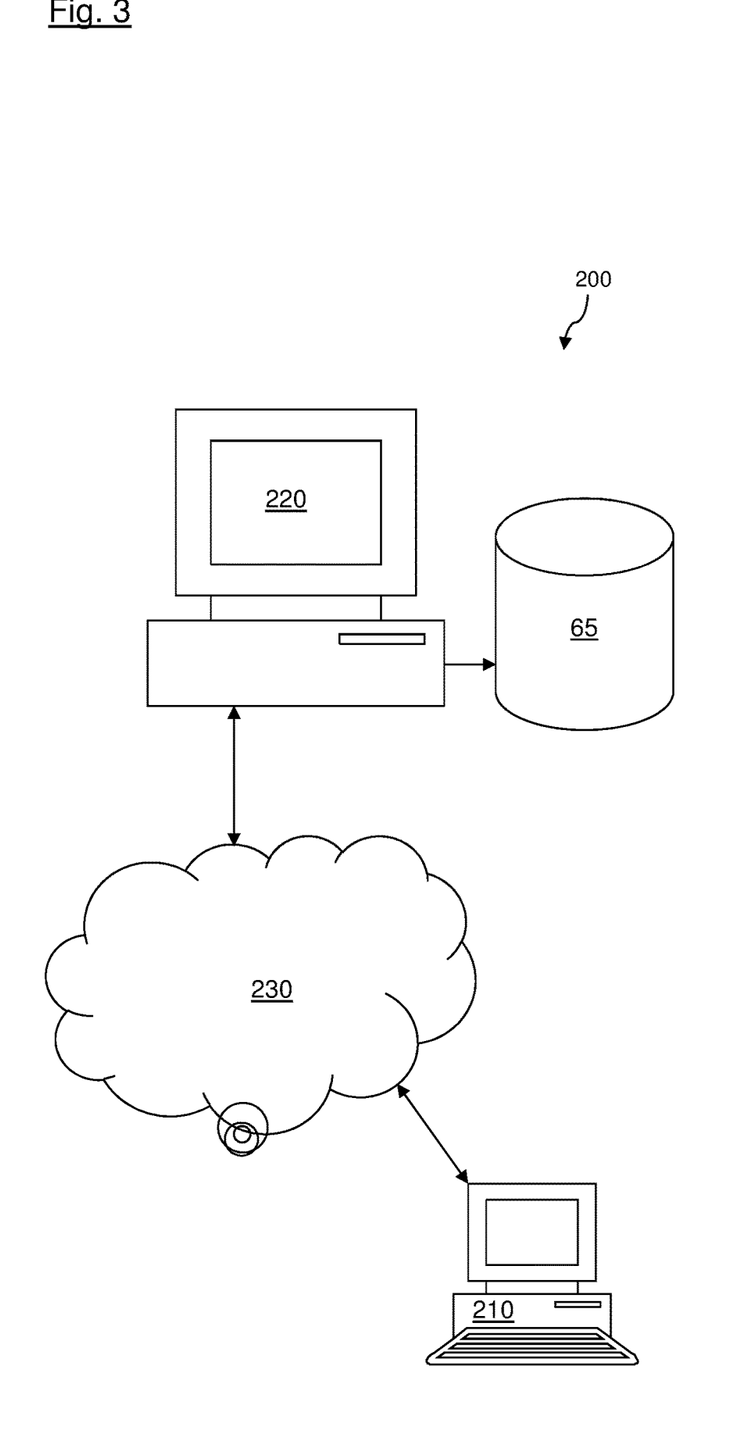
FIG. 3 shows a schematic diagram of a system for searching for digital work, given by way of example only.

FIG. 3 shows a schematic diagram of a system 200 for generating the searchable index, receiving and processing searches of this index and providing the results of the search to an external or search computer 210. A server 220 may administer and controls the database 65. The database may also store the documents relating to each digital work or document to be searched.

The server 220 may also produce the searchable indexes for each digital work as and when they are added to the database according to method 10. A network 230, including an intranet or the Internet, may provide a connection between the external or searching computer 210 and the server 220. This network 230 may provide the means for receiving a search query from the external computer 210. Following conversion of the search query into converted search terms using method 100 by the server 220, the network 230 may also provide the results on the search to the external computer 210.

As will be appreciated by the skilled person, details of the above embodiment may be varied without departing from the scope of the present invention, as defined by the appended claims.

For example, other types of function may be used to generate the index elements and converted search term elements. The normalisation and case changing steps may be omitted. Other types of digital works may be indexed and searched for such as for instance, spreadsheets, software code, books, pdf documents, slide presentations, accounting system, customer relationship management system, human resource system, bank account data, images and web pages. This may cover indexing of any information transmitted by computer code. The database may be a relational database such as for example, Microsoft SQL Server® or Oracle 11G®. A plurality of server, search computer and/or databases may be incorporated into the system 200. The searchable indexes may be proved outside of the database.

The normalisation steps applied to the index elements or converted search terms may involve removing other types of characters. For example all but numbers may be removed. The change of case may not be necessary.

Search terms with Boolean operators may also be used and return results based on such logic requirements.

There may be one index for multiple digital works (of the same or different types) saved in one database or server or spread across different databases or servers particularly over different platforms and sources. There may also be one index for each digital work.

Digital works of different languages may be indexed. For character or pictorial based languages suitable functions or encryption algorithms may be used.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method comprising:
providing, by a computing device, a plain text search term;
receiving, by the computing device, search results, the search results comprising one or more of:
one or more encrypted digital works requiring a decryption key for access;
a link or pointer to one or more encrypted digitals work requiring a decryption key for access; and
a list of one or more encrypted digital works requiring a decryption key for access; the search results formulated by:
applying an encryption function to one or more individual elements within the search term to convert the search term into one or more encrypted search term elements, and
identifying an encrypted digital work having an index containing one or more encrypted index elements that match one or more of the encrypted search term elements, wherein the encrypted index is formed by applying the encryption function to individual elements within the digital work to form a set of the encrypted index elements.

2. A method of searching encrypted digital works, comprising:
applying an encryption function to individual elements within a digital work to form a set of encrypted index elements;
storing the encrypted index elements as an index for the encrypted digital work;
receiving, from a computing device, a plain text search term;
applying the encryption function to one or more individual elements within the search term to convert the search term into one or more encrypted search term elements;
identifying an encrypted digital work having an index containing one or more index elements that match one or more of the encrypted search term elements; and
returning, to the computing device, search results of the identified encrypted digital work, the search results comprising one or more of:
one or more encrypted digital works requiring a decryption key for access;
a link or pointer to one or more encrypted digitals work requiring a decryption key for access; and
a list of one or more encrypted digital works requiring a decryption key for access.

3. The method of claim 2 further comprising forming an array of the individual elements before applying the encryption function to the individual elements.

4. The method of claim 2, wherein the index is stored in a database.

5. The method of claim 2 further comprising removing non-alpha or non-alphanumeric characters from the index elements and from the converted search term elements.

6. The method of claim 2, wherein the digital work is a text document.

7. The method of claim 2, wherein non-alpha or non-alphanumeric characters are removed from the digital work before applying the function.

8. The method of claim 2, wherein storing the index elements further comprises joining the index elements to form a single string and then separating the single string into an array of similar length data units.

9. The method of claim 8 further comprising replicating a predetermined length of data components found in each data unit in the following data unit in the array.

10. The method of claim 2 further comprising ensuring that the case of all characters in the index elements and converted search term elements are either all upper or all lower case.

11. The method of claim 2, wherein the individual elements are words.

12. One or more non-transitory computer readable media comprising computer executable instructions that, when executed, cause a system to perform a method of searching encrypted digital works by:
applying an encryption function to individual elements within a digital work to form a set of encrypted index elements;
storing the encrypted index elements as an index for the encrypted digital work;
receiving, from a computing device, a plain text search term;
applying the encryption function to one or more individual elements within the search term to convert the search term into one or more encrypted search term elements;
identifying an encrypted digital work having an index containing one or more index elements that match one or more of the encrypted search term elements; and
returning, to the computing device, search results of the identified encrypted digital work, the search results comprising one or more of:
one or more encrypted digital works requiring a decryption key for access;
a link or pointer to one or more encrypted digitals work requiring a decryption key for access; and
a list of one or more encrypted digital works requiring a decryption key for access.

13. The computer readable media of claim 12 further comprising forming an array of the individual elements before applying the encryption function to the individual elements.

14. The computer readable media of claim 12 further comprising removing non-alpha or non-alphanumeric characters from the index elements and from the converted search term elements.

15. The computer readable media of claim 12, wherein the digital work is a text document.

16. The computer readable media of claim 12, wherein non-alpha or non-alphanumeric characters are removed from the digital work before applying the function.

17. The computer readable media of claim 12, wherein storing the index elements further comprises joining the index elements to form a single string and then separating the single string into an array of similar length data units.

18. The computer readable media of claim 12 further comprising replicating a predetermined length of data components found in each data unit in the following data unit in the array.

19. The computer readable media of claim 12, wherein the individual elements are words.

\* \* \* \* \*